United States Patent [19]

Hosokawa et al.

[11] Patent Number: 5,286,236
[45] Date of Patent: Feb. 15, 1994

[54] BALL-TYPE SPEED REDUCER

[75] Inventors: Toshihiro Hosokawa, Takatsuki; Hitoshi Ohara, Kyoto, both of Japan

[73] Assignee: Tsubakimoto Chain Co., Osaka, Japan

[21] Appl. No.: 904,851

[22] Filed: Jun. 26, 1992

[30] Foreign Application Priority Data

Jun. 28, 1991 [JP] Japan .................................. 57936

[51] Int. Cl.⁵ .............................................. F16H 13/08
[52] U.S. Cl. ................................................... 475/168
[58] Field of Search ............... 475/162, 165, 168, 196

[56] References Cited

U.S. PATENT DOCUMENTS

| | | | |
|---|---|---|---|
| 3,439,562 | 4/1969 | Bickley | 475/168 |
| 4,537,094 | 8/1985 | Bursa et al. | 74/804 |
| 4,542,664 | 9/1985 | Sladels et al. | 74/804 |
| 4,563,915 | 1/1986 | Tibbals, Jr. | 74/800 |
| 4,643,047 | 2/1987 | Distin et al. | 74/804 |
| 4,829,851 | 5/1989 | Imase | 74/798 |
| 5,016,487 | 5/1991 | Bollman | 74/206 |
| 5,183,443 | 2/1993 | Murakami et al. | 475/168 |
| 5,197,930 | 3/1993 | Imase | 475/168 |

Primary Examiner—Dirk Wright
Attorney, Agent, or Firm—Howson and Howson

[57] ABSTRACT

A novel and improved rotary shaft coupling including a ball-type speed reducer. A driving disc is coupled to a driven disc through a plurality of balls loosely held in a circular array of holes. Each ball registers with opposing faces of elliptic and hypocycloidal grooves of the driven and driving disc, respectively. When the driving disc is rotated, the balls transmit a turning force through the grooves to the driven disc. Speed reduction is determined by the number of waves in the hypocycloidal groove exceeding, by an even number, the number of balls.

1 Claim, 8 Drawing Sheets

BALL-TYPE SPEED REDUCER

BRIEF SUMMARY OF THE INVENTION

This invention relates to rotary shaft couplings, and more particularly to a ball-type speed reducer for rotary shafts.

Ball-type speed reducers of the prior art may typically include a driving disc eccentrically connected to an input shaft and a driven disc mounted on an output shaft. The discs face each other and are drivenly connected by balls inserted between a hypocycloidal groove and an epicycloidal groove in the respective discs. The number of waves in the epicycloidal groove is less, by an even number, than the number of waves in the hypocycloidal groove, and the difference determines the speed ratio.

This type of differential speed reducer has several disadvantages. One is that the eccentric motion of the eccentric disc causes vibration. Another is that it is time-consuming and expensive to machine the grooves in the eccentric disc and in the driven disc.

Accordingly, one object of the invention is to minimize these disadvantages by providing a less complex speed reducer which is smooth in operation and reduces the amount of costly machining of complex grooves in the disc faces.

Another object is to provide a ball-type speed reducer with improved weight balance and minimal backlash.

Still another object is to provide a ball-type speed reducer which can be constructed and maintained at less cost than prior ball-type speed reducers.

These and other objects and aspects of the invention are addressed by a ball-type speed reducer comprising a driving disc with an elliptic groove in one side, a driven disc with a cycloidal groove in one side facing the elliptic groove, a plurality of balls the number of which is less, by an even number, than the number of waves in the cycloidal groove, and a ball retaining disc with through holes arranged in a circle for loosely holding the balls between the elliptic groove and the cycloidal groove.

The speed reducer may operate in two modes of operation. In one mode, the ball retaining disc is locked and the driven disc is the output. In the other mode, the "driven" disc is locked and the ball retaining disc is the output.

The ball-type speed reducer in the first mode is operated with the driving disc on the input side, the driven disc on the output side, and the ball retaining disc locked. When the driving disc is turned, the balls are checked from rotating by the through holes and cannot roll in the direction of rotation of the driving disc along the elliptic groove. Due to the radius of the elliptic groove changing in relation to the balls as the driving disc rotates, the balls repeatedly move close to, and away from, the center of the driving disc. As this occurs, the balls press against the waved part of the cycloidal groove and produce a turning force to the driven disc.

The driven disc rotates in the same direction as the driving disc by a difference between the number of waves $Z_1$ of the cycloidal groove and the number of balls $Z_2$, while the driving disc rotates by the number of waves in the cycloid. Thus, the speed reducer transmits a turning force at a speed reduction ratio of $(Z_1-Z_2)/Z_1$.

In the other mode of operation, the speed reducer is operated with the driving disc on the input side, the ball retaining disc on the output side, and the driven disc locked. When the driving disc turns, the balls roll in the same direction as rotation of the driving disc along the cycloidal groove of the locked driven disc. The balls, being engaged in the elliptic groove of the driving disc, must always be present where the cycloidal grooves of the driven disc meet. Therefore, the balls receiving a turning force through the elliptic groove of the driving disc are prevented from moving by the cycloidal groove of the driven disc. Being guided to the part where the grooves of the driven disc meet and rolling in the opposite direction as rotation of the driving disc, the balls roll at a slower speed than the driving disc and turn the ball retaining disc via the through holes.

The ball retaining disc turns in the reverse direction as the driving disc by the difference between the number of waves $Z_1$ of the cycloid and the number of balls $Z_2$, while the driving disc turns by the number of waves of the cycloid. That is, the speed reducer transmits the turning force at the speed reduction ratio of $(Z_2-Z_1)/Z_2$. In this case, the difference is a negative number, which indicates that the ball retaining disc rotates in a direction opposite to the direction of rotation of the driving disc.

DETAILED DESCRIPTION

Figure 1:
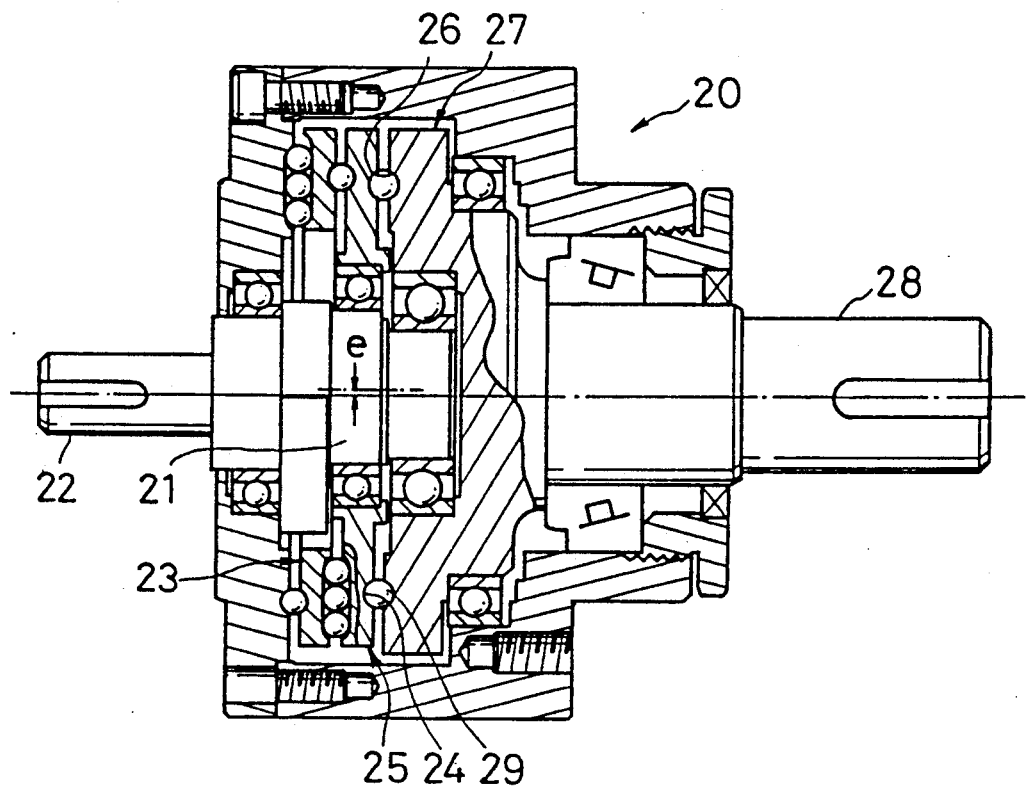
FIG. 1 is a longitudinal sectional view of a prior art ball-type speed reducer.
Figure 2:
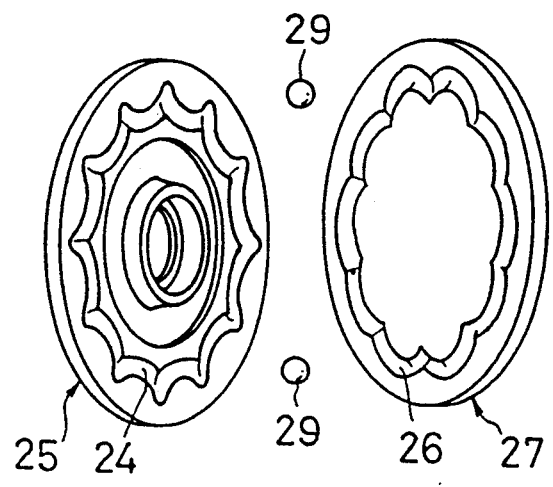
FIG. 2 is a perspective view of an eccentric disc and a driven disc in the speed reducer of FIG. 1.

Speed reducers using balls as power transmission elements are well known in the art. As illustrated in FIGS. 1 and 2, such a speed reducer, indicated generally by the number 20, consists of a driving shaft 22 having a cam 21 of eccentricity e, a ball-type Oldham coupling 23, a ring-like eccentric disc 25 mounted on cam 21 with a hypocycloidal groove 24, a driven disc 27 with an epicycloidal groove 26 having a number of waves less, by an even number, than the number of waves in hypocycloidal groove 24 and a driven shaft 28 formed integrally with driven disc 27. Grooves 24 and 26 of eccentric disc 25 and driven disc 27 face each other with balls 29 inserted therebetween. Rotation of driving shaft 22 causes cam 21 to turn the eccentric disc 25 while tracing a circle of radius e in a state in which rotation is controlled. That is, the motion of disc 25 is eccentric, and when it revolves by the number of waves of the groove 24, the driven disc 27 turns by the difference between the number of waves in grooves 24 and 26.

Figure 3:
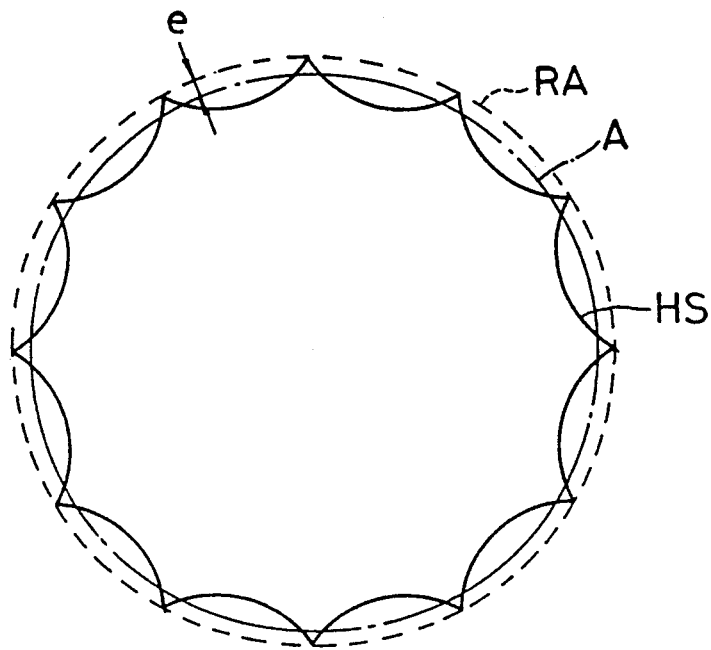
FIG. 3 is a hypocycloid defining the curvature of a groove in the eccentric disc of FIG. 2.

As shown in FIG. 3, the hypocycloidal groove 24 is defined by a curve HS which is traced by a point on a circle of radius of e internally rolling along a circle RA of radius $R_A$. The relationship between $R_A$ and a basic circle A of radius R is $R_A = R + e$, where e is the above-described eccentricity, the value of which is positive.

Figure 4:
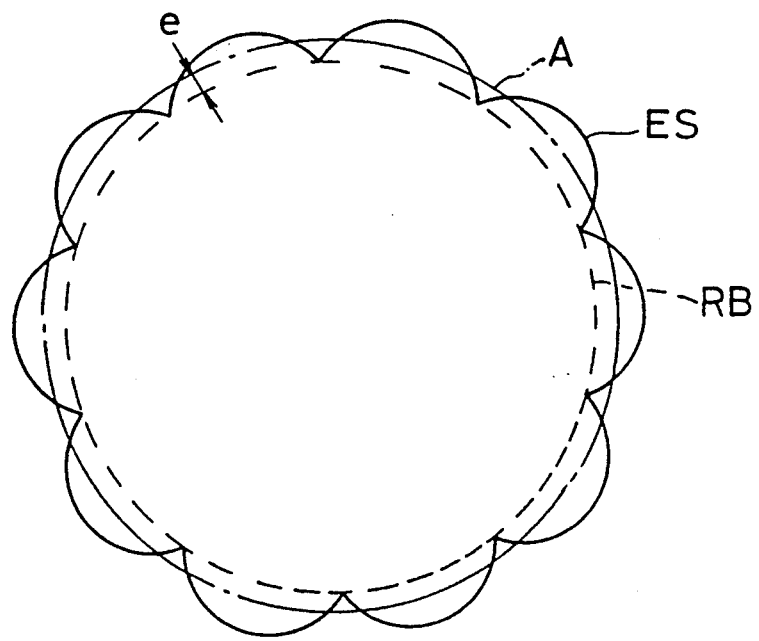
FIG. 4 is an epicycloid defining the curvature of a groove in the driven disc of FIG. 2.

As shown in FIG. 4, the epicycloidal groove 26 is defined as a curve ES which is traced by a point on a circle of radius e externally rolling along a circle $R_B$. The relationship between $R_B$ and radius R of basic circle A is $R_B = R - e$ where e is the above-described eccentricity, the value of which is positive.

As noted above, prior art ball-type speed reducers experience vibrations due to eccentric motion of the eccentric disc, as well as require considerable time and expense to machine the grooves in the eccentric and driven discs. These and other shortcomings are overcome by a ball-type speed reducer constructed according to the invention.

Figure 5:
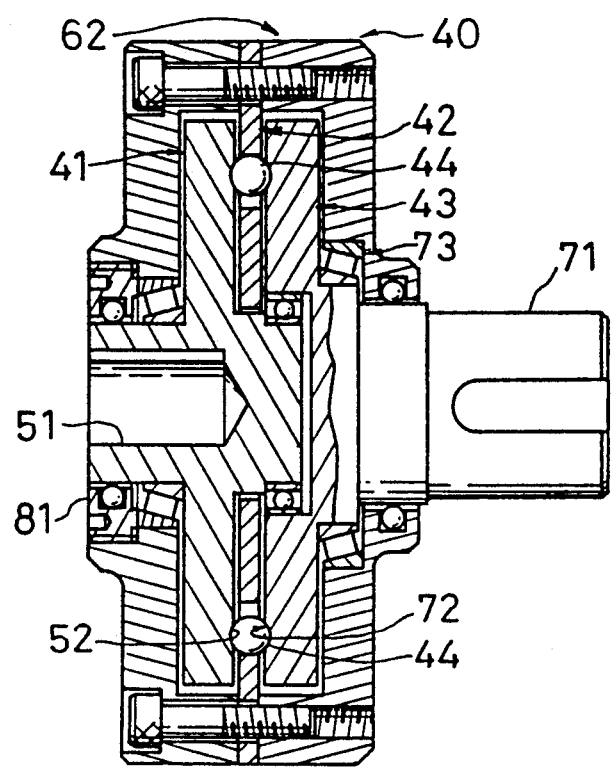
FIG. 5 is a longitudinal section view of a ball-type speed reducer according to the present invention.
Figure 7:
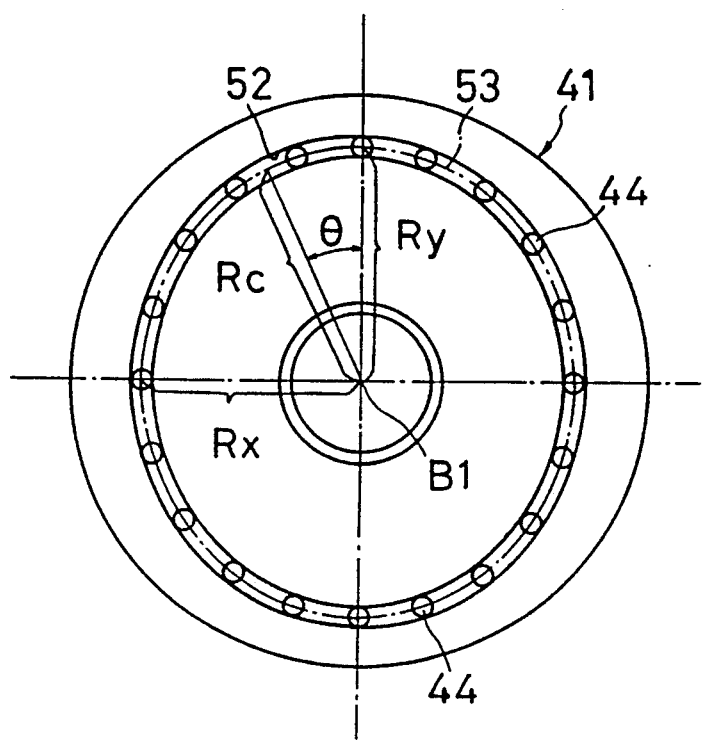
FIG. 7 is a view of a state of engagement of the balls with the elliptic groove of the driving disc in the speed reducer of FIG. 5.

Referring now to the embodiment of FIG. 5, a ball-type speed reducer 40 according to the invention comprises a driving disc 41, a ball retaining disc 42, a driven disc 43 and a plurality of balls 44. Driving disc 41 includes an input shaft hole 51 in one side and an elliptical groove 52 in the other side. In FIG. 7, the radius $R_c$ at any point in elliptical groove 52 is expressed by the equation $$Rc = \frac{(Ry + Rx)}{2} + \frac{4(Ry - Rx)\cos 2\theta}{2}$$

where Ry denotes the radius at the long axis of an ellipse 53, Rx denotes the radius at the short axis of the same, and $\theta$ denotes the angle radius $R_c$ makes with the long axis.

Figure 8:
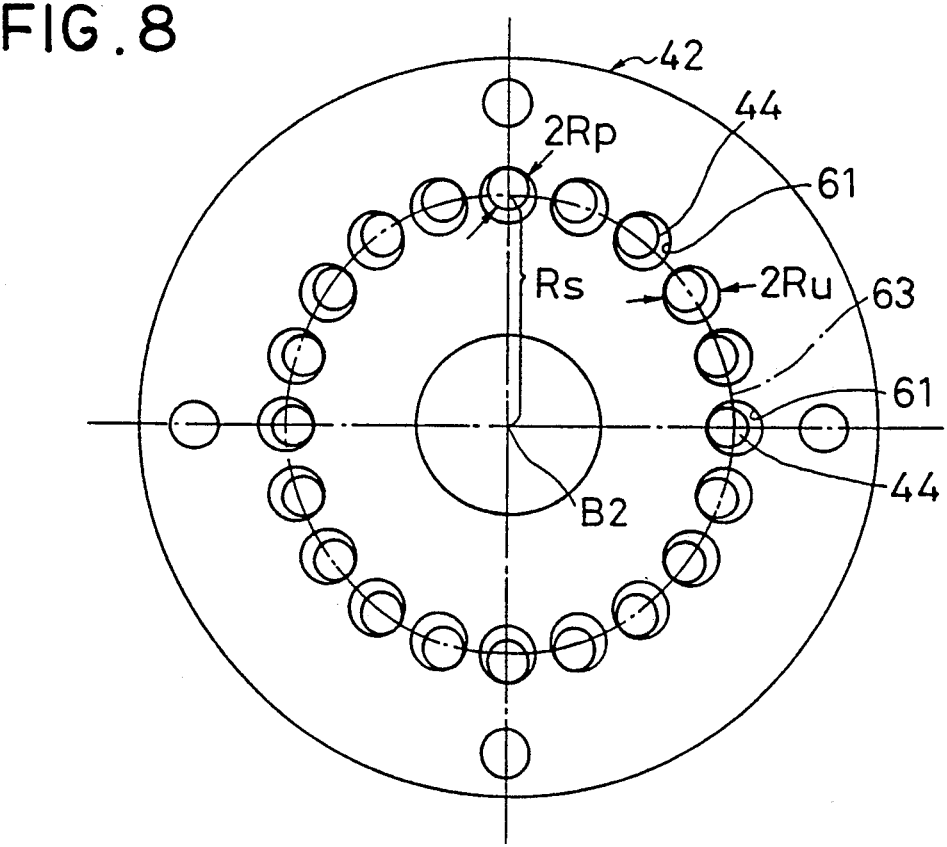
FIG 8 is a view of a state of engagement of the balls through the holes in a ball retaining disc in the speed reducer of FIG. 5.

Referring to FIG. 8, ball retaining disc 42 is fixed integral with a casing 62 and has a plurality of through holes 61 in which balls 44 are loosely fitted. Through holes 61 are arranged on a circle 63 of a radius defined as $Rs = (Ry + Rx)/2$. The radius Ru of through holes 61 is expressed as $Ru = Rp + (Ry - Rx)/2$, where Rp is the radius of balls 44. In the illustrated example, the number of through holes 61 and balls 44 is 20, which is less than the number of waves in epicycloidal groove 52 by two, as explained hereinbelow.

Figure 9:
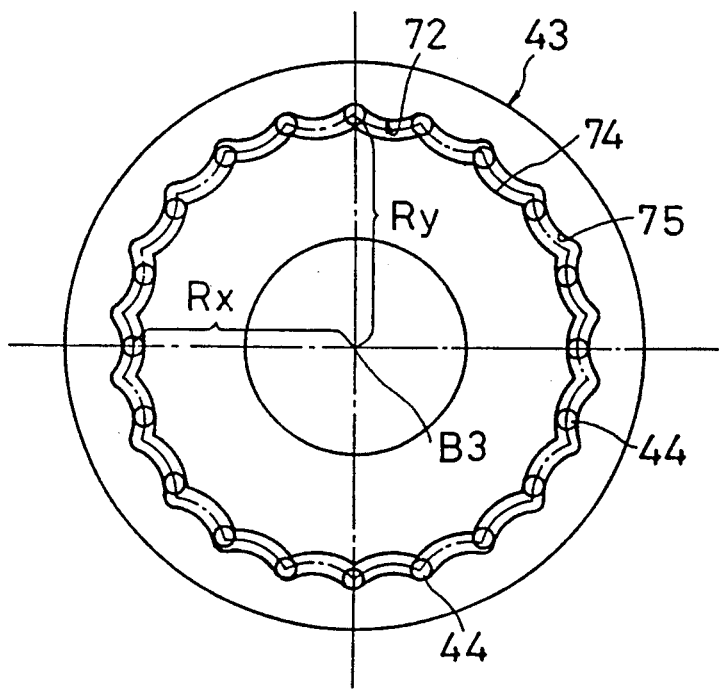
FIG. 9 is a view of a state of engagement of the balls with the hypocycloidal groove of the driven disc in the speed reducer of FIG. 5.

Driven disc 43 has an output shaft 71 on one side rotatably mounted in a bearing 73 in casing 62, and a hypocycloidal groove 72 in the other side. Groove 72 defines a hypocycloid traced by a point on a circle (not shown) of a radius $f = Ry - Rx$ internally rolling along a circle (not shown) of a radius $Rw = Rs + f$. In the embodiment of FIG. 9, the number of waves in groove 72 is 22, which is larger than the number of through holes 61 and balls 44 by two.

The centers B1, B2 and B3 of ellipse 53, circle 63 and the groove 72 coincide. Therefore hypocycloidal groove 72 faces elliptic groove 52 across ball retaining disc 42 interposed therebetween. Casing 62 is provided with a nut 81 (FIG. 5) for backlash adjustment. Turning nut 81 adjusts the pressure for holding balls 44 between elliptic groove 52 and hypocycloidal groove 72 thereby decreasing backlash.

Figure 6:
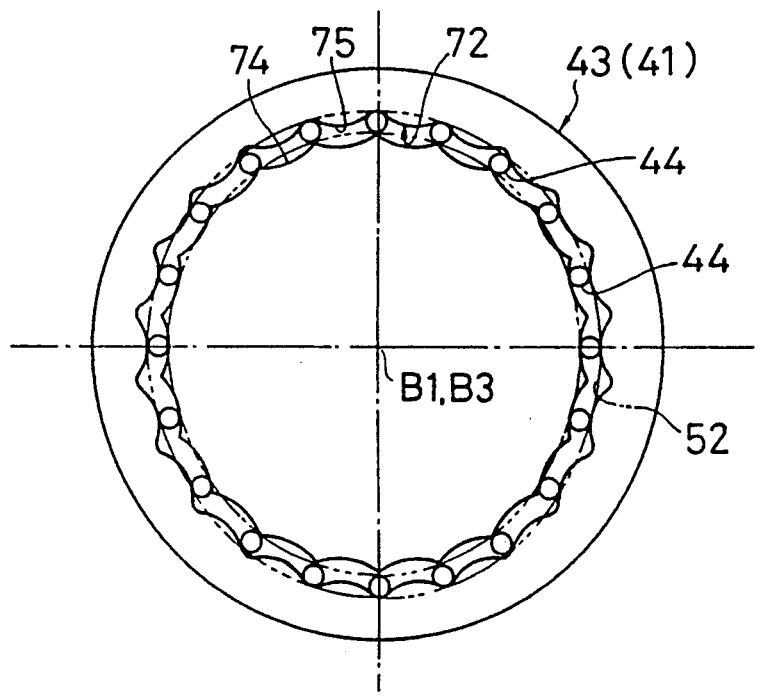
FIG. 6 is a view of a state of engagement of balls with an elliptic groove of a driving disc and a hypocycloidal groove of a driven disc in the speed reducer of FIG. 5.

The balls 44 shown in FIGS. 6, 7 and 9 are illustrated by circles defining only the surface areas which contact grooves 52 and 72. Therefore the circles appear smaller than the diameter of the balls.

Speed reducer 40 may be used in either one of the two aforementioned modes. In the first mode driving disc 4 is rotated with ball retaining disc 42 and casing 62 locked, and driven disc 43 coupled to a driven apparatus (not illustrated). In the second mode driving disc 41 is rotated with driven disc 43 locked and ball retaining disc 42 and casing 62 coupled to the driven apparatus.

The first mode will now be explained with reference to FIGS. 10 to 15, and more specifically to a through hole 611 and a ball 441 located in positions corresponding to the long radius Ry of elliptic groove 52 in driving disc 41. The straight line $C_1$ indicates a start position of driven disc 43, and the straight line $C_2$ shows a rotated position of driven disc 43. Balls 441 and 44 are represented by concentric circles, the inside small circle defining the surface areas of the ball in contact with grooves 52 and 72, and the outside large circle defining the exterior shape of the ball itself.

Figure 10:
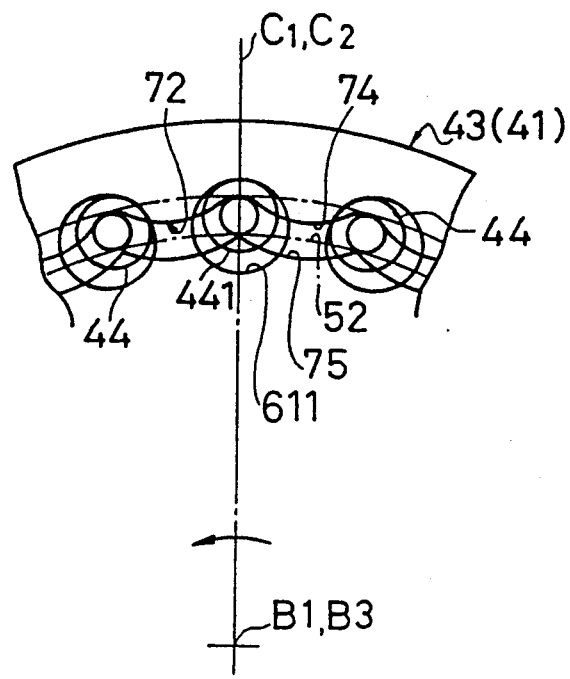
FIGS. 10–15 are views explaining operation of the speed reducer at different positions of the driving and driven discs of FIGS. 7 and 9.
Figure 11:
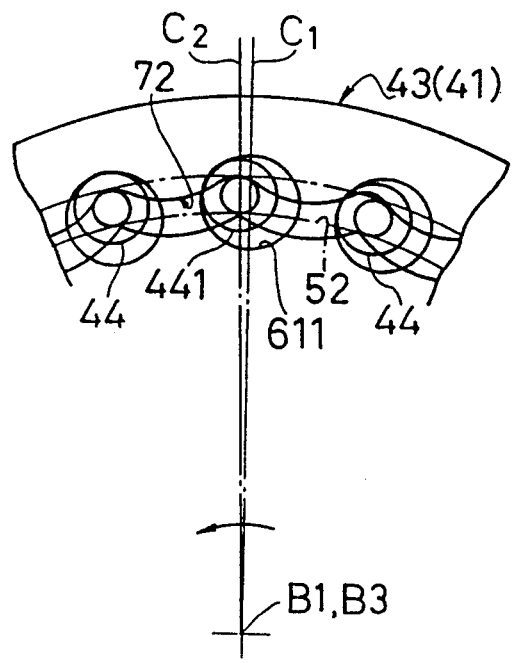
Figure 12:
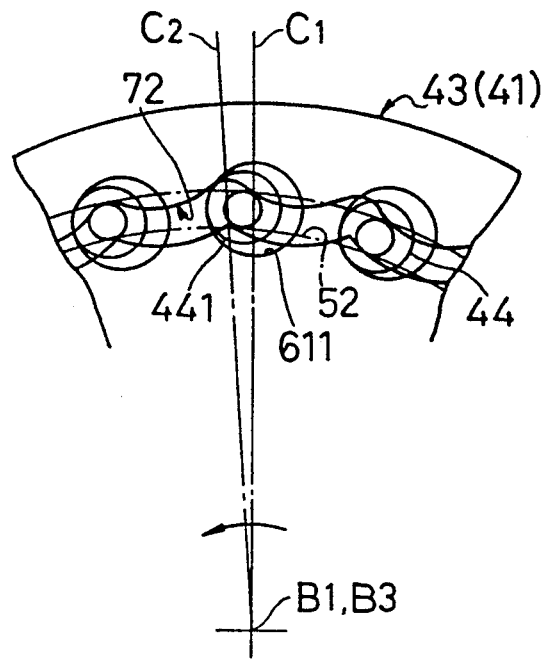
Figure 13:
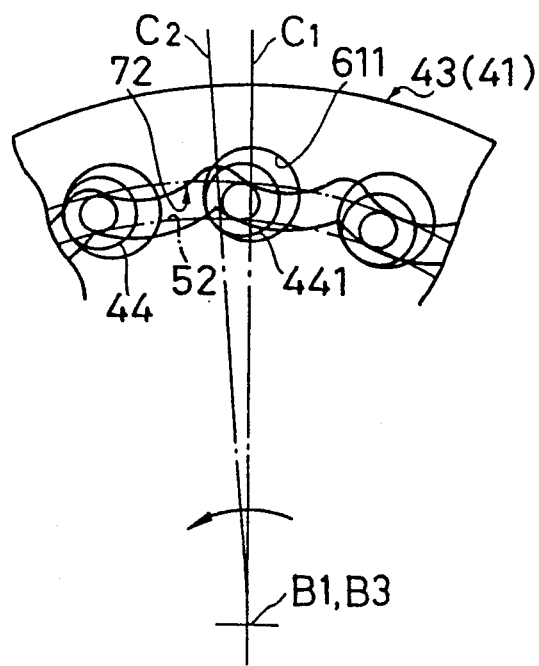
Figure 14:
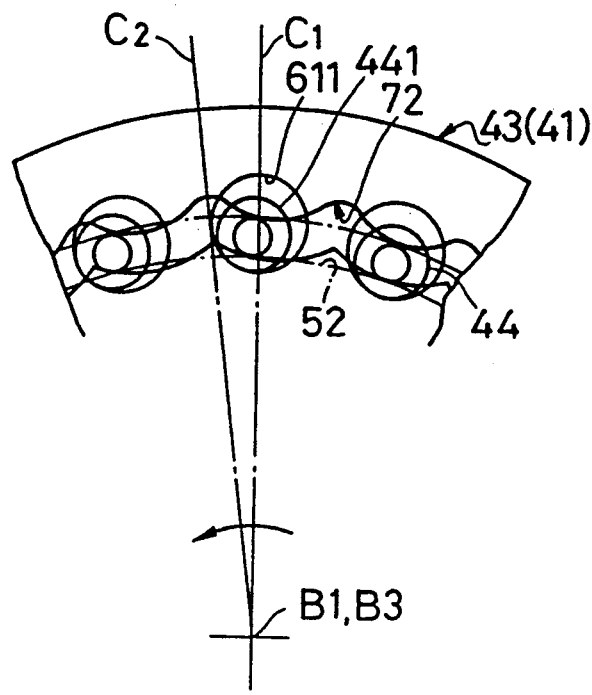
Figure 15:
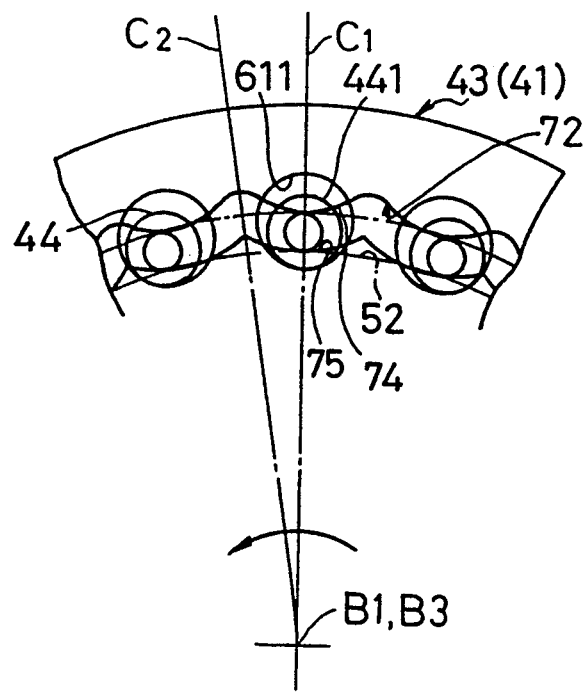

When driving disc 41 is turned counterclockwise, as shown by the arrow in FIG. 10, ball 441 rotates leftward along the elliptic groove 52, but is checked from rotation by through hole 611. With the rotation of driving disc 41, the radius of groove 52 in relation to ball 441 decreases, and ball 441 travels toward the center B1 of driving disc 41 (see FIGS. 11 to 15). The amount of travel is equal to the radius f, as defined above.

Ball 441 pushes against a concave section 74 of groove 72 while moving toward the center B1 of driving disc 41, turning driven disc 43 in the counterclockwise direction. At the minimum radius Ry of elliptic groove 52 in relation to ball 441, the lowest part of concave section 74 is moved as far as ball 441 (see FIG. 15.) Thereafter, with an increase in the radius of groove 52 in relation to ball 441, ball 441 pushes against a convex section 75 of groove 72 while moving away from the center B1 of driving disc 41, thus transmitting rotation to driven disc 43.

Ball 441 is repeatedly moved toward and away from the center B1 of driving disc 41 by elliptic groove 52, alternately pushing concave section 74 and convex section 75 of groove 72 causing driven disc 43 to rotate. Driven disc 43 turns in the same direction as driving disc 41 by the difference (2) between the number of waves (22) of the hypocycloid in groove 72 and the number of balls 44 (20) while driving disc 41 turns by the number of waves of the hypocycloid. In the illustrated example, speed reducer 40 therefore transmits the turning force at a speed reduction ratio of (22-20)/22 or 1:11.

The second mode of operating speed reducer 40 uses driving disc 41 as the input side, ball retaining disc 42 and casing 62 as the output side, and with driven disc 43 locked. When driving disc 41 is rotated, balls 44 rotate in the direction of driving disc 41 along groove 72 of driven disc 43 which is in a locked state. Being engaged also with groove 52 of driving disc 41, balls 44 must be in the position where groove 52 of driving disc 41 and groove 72 of driven disc 43 meet. The radius of curvature of the waves in groove 72 of driven disc 43 is less than that of the circular arc of groove 52 of the driving disc 41. Being guided to a position where grooves 52 and 72 meet, balls 44 are checked from rotation by groove 72 but are driven by groove 52 at a lower speed than the rotation of driving disc 41. Ball retaining disc 42 is rotated in the reverse direction as driving disc 41 as balls 44 move within through holes 6. Casing 62, integrally fixed to ball retaining disc 42, therefore drives an apparatus by means (not shown) such as a belt or gear mechanism.

Ball retaining disc 42 turns a amount equal to the difference (2) between the number of the balls (20) and the number of waves (22) of the hypocycloid while driving disc 41 turns an amount equal to the number of waves (2) of the hypocycloid. In the illustrated example, speed reducer 40 therefore transmits the turning force at a speed reduction ratio of (20-22)/20 or −1:10. The negative symbol indicates that ball retaining disc 42 rotates in the reverse direction of driving disc 41.

Some of the many advantages of the ball-type speed reducer of the present invention should now be readily apparent. Since all the balls are held between the driving disc and the driven disc, the entire side faces of the discs are in engagement with the balls, thereby increasing rigidity. The balls rotate within the grooves of the disc in a manner affording improved efficiency in power transmission. There being no eccentrically moving disc, mechanical vibration is substantially reduced. Torque transmission power is shared by each ball in approximately symmetrical in relation to the shaft, providing thereby excellent in weight balance which further lessens vibration. Backlash in the speed reducer is minimized thus further insuring smooth operation with changes in direction of rotation from normal to reverse and vice versa. Because of the fewer number of components and simplified groove machining, it is possible to construct the speed reducer at less cost.

It will be understood, of course, that various changes in the details, materials, steps and arrangement of parts, which have been herein described and illustrated in order to explain the nature of the invention, may be made by those skilled in the art within the principle and scope of the invention as expressed in the appended claim.

I claim:

1. A ball-type speed reducer comprising: a driving disc rotatable about an axis and having an elliptic groove in one side centered around said axis, a driven disc rotatable about said axis and having a cycloidal groove in one side facing said elliptic groove centered around said axis, a plurality of balls the number of which is less than by an even number the number of waves of said cycloidal groove, and a ball retaining disc having through holes arranged on a circle for loosely holding said balls, said elliptic groove and said cycloidal groove holding said plurality of balls therebetween.

* * * * *